United States Patent

Nakagawa et al.

Patent Number: 5,494,721
Date of Patent: Feb. 27, 1996

[54] MAGNETIC DISC SUBSTRATE

[75] Inventors: Nobuo Nakagawa; Hirayoshi Tanei, both of Yokohama, Japan

[73] Assignee: Hitachi, Ltd., Tokyo, Japan

[21] Appl. No.: 112,255

[22] Filed: Aug. 26, 1993

Related U.S. Application Data

[60] Continuation of Ser. No. 787,881, Nov. 5, 1991, abandoned, which is a division of Ser. No. 462,775, Jan. 10, 1990, Pat. No. 5,093,173.

[30] Foreign Application Priority Data

Jan. 13, 1989 [JP] Japan ............................ 1-4969
Nov. 17, 1989 [JP] Japan ............................ 1-297452

[51] Int. Cl.$^6$ ........................................ G11B 5/00
[52] U.S. Cl. .................. 428/64.1; 428/65.3; 428/149; 428/325; 428/410; 428/426; 428/428; 428/694 ST; 428/694 SG; 428/900
[58] Field of Search ..................... 428/64, 65, 325, 428/408, 426, 428, 471, 900, 694 ST, 694 SG, 64.1, 65.3, 141, 143, 149, 402, 410, 336; 360/135; 501/4, 5, 6, 7, 8, 9

[56] References Cited

U.S. PATENT DOCUMENTS

| | | | |
|---|---|---|---|
| 3,754,881 | 8/1973 | Petticrew | 65/33 |
| 3,938,978 | 2/1976 | Hummel | 65/33 |
| 3,962,514 | 6/1976 | Rittler | 428/334 |
| 4,083,727 | 4/1978 | Andrus et al. | 106/39.7 |
| 4,683,168 | 7/1987 | Hares et al. | 428/335 |
| 4,758,471 | 7/1988 | Arioka et al. | 428/336 |
| 4,833,001 | 5/1989 | Kijima et al. | 428/141 |
| 4,833,031 | 5/1989 | Kurokawa et al. | 428/336 |
| 4,859,505 | 8/1989 | Nakayama et al. | 427/305 |
| 4,908,727 | 3/1990 | Ezaki et al. | 360/135 |
| 4,971,932 | 11/1990 | Alpha et al. | 501/3 |
| 4,985,306 | 1/1991 | Morizane et al. | 428/410 |
| 5,087,481 | 2/1992 | Chen et al. | 427/129 |
| 5,093,173 | 3/1992 | Nakagawa et al. | 428/64 |

FOREIGN PATENT DOCUMENTS 62-072547  4/1987  Japan.

*Primary Examiner*—Stevan A. Resan
*Attorney, Agent, or Firm*—Antonelli, Terry, Stout & Kraus

[57] ABSTRACT

A substrate for a magnetic disc, which comprises a crystallized glass consisting essentially of an amorphous glass continuous phase and crystal particles dispersed in the continuous phase, the substrate having fine projections of the crystal particles on the surface thereof, a method of producing the substrate, the magnetic disc using the substrate, and a method of producing the magnetic disc are provided. The crystallized glass is made from a glass material of a $Li_2O$—$SiO_2$, $Li_2O$—$Al_2O_3$—$SiO_2$, $Li_2O$—$MgO$—$Al_2O_3$—$SiO_2$, $MgO$—$Al_2O_3$—$SiO_2$, $Na_2O$—$Al_2O_3$—$SiO_2$ or $BaO$—$Al_2O_3$—$SiO_2$ system, and the crystal particles have one or more compositions selected from $Li_2O$—$SiO_2$, $Li_2O.2SiO_2$, $Li_2O.Al_2O_3.2Si_2$, $Li_2O.Al_2O_3 4SiO_2$, $SiO_2$ and $2MgO$—$2Al_2O_3.5SiO_2$, and an average particle size of 0.01 to 3.0 μm, and are projected at a density of $10^2$ to $10^6$/ mm$^2$ and at an average height of 0.005 to 0.2 μm on the surface of the substrate, the total surface area of the projections of crystal particles occupying at most 30% of the unit surface area of the substrate. The projections are made by chemical etching with an aqueous solution of hydrofluoric acid, physical etching with sputtering under vacuum or ion-milling, or mechanical etching with sand blasting. The magnetic disc comprises the crystallized glass substrate, a chromium or chromium alloy undercoat film, thin magnetic film, protective carbon film and lubricant film.

3 Claims, 3 Drawing Sheets

MAGNETIC DISC SUBSTRATE

This is a continuation of application Ser. No. 07/787,881, filed Nov. 5, 1991 now abandoned, which is a division of application Ser. No. 07/462,775, filed Jan. 10, 1990, now U.S. Pat. No. 5,093,173.

BACKGROUND OF THE INVENTION

1. Field of the Invention

The present invention relates to a magnetic disc, more particularly to a magnetic disc substrate suitable for making the magnetic disc which causes substantially no sticking to a magnetic head and is excellent in wear durability and head flyability, with low costs, a method of producing the substrate, a magnetic disc using the substrate and a method of making the disc.

2. Description of Related Art

For avoiding the sticking of a magnetic head to a thin film magnetic recording disc, a substrate for the thin film magnetic disc has been required to have a properly rough surface rather than a mirror surface. For this, there have been made some proposals: Japanese Patent Kokai (Laid-Open) No. 62-248133 discloses to form concentric circular grooves called a texture on the surface of Ni-P by machining; Japanese Patent Kokai (Laid-Open) No. 60-38720 discloses to use the surface irregularities of an $Al_2O_3$-TiC ceramic substrate; and Japanese Patent Kokai (Laid-Open) No. 61-123016 discloses to disperse fine particles in a primary plating layer.

None of the substrates of prior art have met all requirements at the points of disc performance, cost and mass-productivity and hitherto substrates which are unsatisfactory in some properties must have been used. In this respect, the following explanation will be made.

In case of a magnetic disc which comprises an Ni-P substrate and a Cr undercoat, a magnetic medium, a protective film, and a lubricating oil film which are formed on the mirror polished surface of the substrate, lubricating oil and water gather at the area of contact between the disc and the head at the time of stopping of head, resulting in sticking phenomenon of head. This causes impossibility of rotation of disc, and rupture and deformation of parts of mechanism for holding head.

Therefore, at present, processing of concentric circular grooves called texturing is conducted on the Ni-P polished surface to roughen the surface to prevent sticking. However, this texturing have such substantial problems as mentioned below. That is, the texturing comprises cutting the surface of Ni-P by fine abrasive grains and hence burrs tend to be produced due to the plastic flow of material in texturing, or projections with which a head collides tend to be produced owing to the re-adhesion of cuttings. Therefore, it is difficult to form a surface for flying the head at a spacing of, for example, about 0.2 μm over the whole surface of the disc.

Furthermore, when the Ni-P substrate is subjected to the texturing to reduce the sticking to the magnetic head, there is also an essential problem that the flyability of the magnetic head is lowered. Therefore, there is a difficulty in texturing that the surface roughness of the substrate must be controlled to so a narrow range that the stickiness and flyability of the magnetic head both are moderately satisfied.

Prior art texturing is carried out in one coaxial direction and, therefore, there is a problem that the effect of reducing sticking to the magnetic head is poor for the radial movement of the magnetic head, i.e., the operation of the head in a so-called seeking mode. Furthermore, this texturing forms banks at both the sides of the channel provided by the texturing, which banks prevent the securing of a narrow spacing between the disc and the magnetic head.

In the future, in order to increase a recording density of disc, it will become necessary to reduce stepwise the distance of the spacing and at that time the texturing carried out at present will provide various problems.

Another problem of the textured Ni-P substrate is its costs. The disc substrate which is produced by the preparation of an Al substrate, grinding of the surface of Al substrate, plating of Ni-P, polishing of the surface of the Ni-P plating and texturing of the surface requires many steps and the costs are not necessarily low. One reason therefor is that the disc substrate is a composite comprising films of two different materials Al and Ni-P. On the other hand, a substrate comprising a single material such as ceramic or glass requires fewer production steps and costs can be reduced.

As explained above, the texturing of the Ni-P layer has substantial problems in head flyability and costs. The present invention has solved these problems, as mentioned hereinafter.

Next, conventional ceramic substrates will be explained. For the substrates, a composite ceramic substrate such as $Al_2O_3$-TiC, as referred to above is used. The surface is once subjected to grinding and then a rugged surface is formed by chemical or physical etching utilizing a difference in properties of materials.

According to this method, a height of projections and intervals between the projections made by grinding on the finished surface are determined depending on the state of dispersion of the two materials $Al_2O_3$ and TiC and so a high-level dispersing technique is necessary.

This $Al_2O_3$-TiC substrate had the following two problems. The first one is that it is heavy in weight and the other that it contains voids. With reference to the weight, the specific gravity of $Al_2O_3$ (alumina) is about 4 which is about 1.5 time that of metallic Al. This is a property which is undesirable for the mechanism of a magnetic disc which rotates at a high speed. However, there remains a countermeasure against this problem which comprises reducing a thickness of plate, taking into consideration the high strength of ceramics.

However, the presence of voids is a substantial problem determined by the kind of material and process. That is, since a ceramic substrate is formed by sintering ceramic powders, void between particles cannot completely be removed. Therefore, a high-pressure hot pressing method has been studied, but this method still cannot completely remove the voids. Processing oils and water are liable to penetrate and remain in the voids and these cause formation of defects in films provided thereon or reduction of adhesion between films.

For the above two reasons, the substrate comprising composite ceramic has problems in the actual use thereof. On the other hand, as mentioned hereafter, the present invention provides an essentially excellent substrate material which is free from these problems.

The third method referred to above as conventional method by which fine particles are dispersed in a plating layer comprises specifically incorporating fine particles in the order of several microns or of submicron such as those of $Al_2O_3$ and SiC into an Ni-P chemical plating solution. By this method, there is formed a film comprising an Ni-P matrix in which hard fine particles are dispersed.

The most serious problem of this method is that the fine particles of, for example, $Al_2O_3$ or SiC cannot be uniformly dispersed in the plating film, resulting in dependence in particle density on places. Therefore, this method is not suitable for a magnetic disc substrate which requires uniform surface roughness and surface contour over the whole surface. Further problem is that the Ni-P becomes ferromagnetic by heating to about 250° C.

On the other hand, it is known to use a strengthened glass as substrate for the magnetic disc. This glass substrate difficult to break is produced by exchanging sodium ion in the surface portion of ordinary glass by potassium ion or the like which is larger in ionic radius than sodium ion to provide on the surface a strengthened layer having compressive stress.

When the magnetic disc is produced actually using this strengthened glass; substrate, the surface of the substrate must be properly roughened by similar texturing to that applied to an Ni-P plating film. However, if the surface of glass having a strong compressive stress is subjected to texturing, chipping is liable to occur and thus it is considerably difficult to form a textured surface which is uniform and is free from defects.

SUMMARY OF THE INVENTION

One object of the present invention is to provide a substrate for magnetic disc free from the above-mentioned problems of the conventional technique and is excellent in disc characteristics.

That is, the object of the present invention is to provide a novel substrate material which is superior to conventional substrates in overall characteristics required for the magnetic disc substrate, such as non-magnetic property, light weight properties, mechanical strengths and non-defectiveness and besides proper surface roughness and surface contour for prevention of sticking to head which relate to wear durability, productivity necessary in actual production of magnetic discs, heat resistance and inexpensiveness, and a method for producing such substrate.

Another object of the present invention is to provide an improved thin film magnetic disc using the above-mentioned magnetic disc substrate and a method of making the thin film magnetic disc.

BRIEF OF THE DRAWINGS

DESCRIPTION OF THE INVENTION

Figure 1:
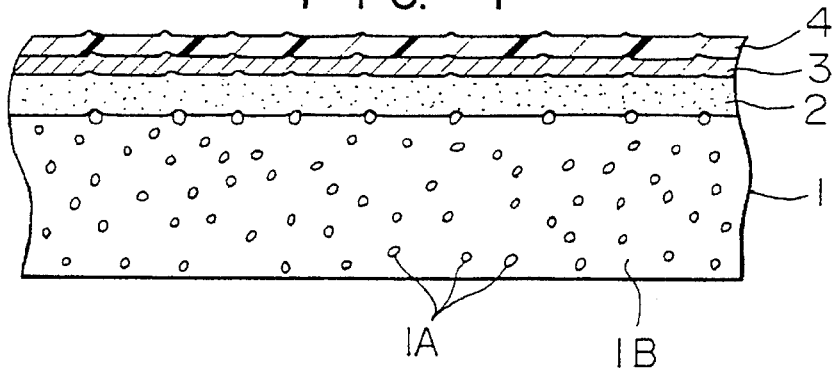
FIG. 1 is a cross-sectional view of a magnetic disc having a crystallized glass substrate according to the present invention.

The above object can be accomplished by using a crystallized glass as substrate material.

That is, a substrate suitable for attaining the above object is formed by using as a substrate material a crystallized glass which is a kind of composite material which comprises amorphous glass as a continuous phase in which crystal phase is isolatedly dispersed and by forming many fine projections on the surface utilizing the characteristics of this material.

How the crystallized glass acts to solve the above-mentioned problems will be explained with reference to the crystallized portion which is present as dispersed particles in the crystallized glass and the glass layer which is a continuous matrix layer.

First, materials for the crystallized glass and a process for production thereof will be explained. The crystallized glass in the present invention comprises materials in combination which are selected from alkali metal oxides ($Li_2O$, $Na_2O$, $K_2O$), alkaline earth metal oxides (MgO, CaO, BaO, SrO) and $Al_2O_3$, $SiO_2$, and the like. Process of production comprises melting the raw materials, then making the melt into a plate, and thereafter subjecting the plate to a heat treatment, etc. for crystallization, thereby to precipitate crystals, for example, of $Li_2O.2SiO_2$ partially in amorphous glass.

The size of the crystallized portion is suitably within the range of about 0.01 — about 3.0 μm as mentioned hereinafter, and the size and density can be controlled by heat treating conditions. The composition of this crystallized portion is $Li_2O.2SiO_2$, $Li_2O.SiO_2$, $LiO_2.Al_2O_3.2SiO_2$, $Li_2O.Al_2O_3.4SiO_2$, $SiO_2$ or $2MgO.2Al_2O_3.5SiO_2$, etc. Generally, the crystallized portion is harder than the matrix layer and is chemically stable and thus fine projections uniformly dispersed on the surface of the substrate can be formed by proper selection of processing methods and conditions. The fine projections are contact points with a magnetic head and so have an effect to prevent the phenomenon of sticking with a head which caused by a lubricating oil or water. They also serve to prevent damaging of a magnetic film caused by collision with a magnetic head which contacts intermittently with the magnetic film during rotation of the disc at a high speed. These fine projections have a further action to clean stains which are deposited on the slider surface of the magnetic head. Thus, they have further effect to prevent crash or collision of head and greatly increase reliability and life of a disc file.

That is, the fine projections on the surface of crystallized glass have characteristics superior to action and effect of textured surface which has been conventionally widely practised.

As mentioned above, crystallites are formed substantially due to the natural phenomenon of transformation of an amorphous body to a stable crystalline body, and the projections are formed utilizing the difference in properties such as etchability or hardness between a glass phase and crystallized phase. This is a process which has substantially no difficulty in the steps of projection-formation. Therefore, there are no problems such as burrs, chippings and re-adhesion of cutting powders which are problems in the conventional texturing. Furthermore, the height of projections can be controlled by optimizing the size and density of crystal fine grains and, as a result, a surface which is very excellent in head flying characteristics can be formed over the whole surface of the substrate.

The crystallized portion becomes the terminal of microcracks which are generated in a glass continuous layer and has the action to inhibit growing and spreading of cracks. Thus, the mechanical strength and hardness of the crystallized glass increase and the crystallized glass becomes difficult to break and has an effect to realize a sufficient mechanical strength for magnetic disc substrate.

Next, the action and advantages of the glass layer as a continuous layer will be shown below.

(1) It is non-magnetic in view of compositions of materials and has no possibility of becoming magnetic by heating. (2) It is inexpensive because the raw materials comprise elements (Al, Si, Na, O, etc.) which abundantly exist on the earth. (3) Because of single substrate material, the number of steps can be small and production costs can be reduced. (4) There are no voids and spaces which are problems in sintered materials such as ceramics because of glassification after the melting step.

Furthermore, because of utilization of a natural phenomenon of crystallization, precipitated fine crystal particles are essentially uniformly dispersed.

As shown above, the crystallized glass has excellent properties due to respective advantages of precipitated crystal layer and matrix glass layer and interaction of these layers. Therefore, the crystallized glass is a composite material suitable as high performance substrate for magnetic disc.

The objects of the present invention are achieved as follows:

(a) As the magnetic disc substrate is used a crystallized glass comprising an amorphous glass matrix containing crystals dispersed therein. The substrate is mirror-like polished on the surface thereof by machining and then at least dipped in an aqueous hydrofluoric acid solution to selectively and preferentially etch the amorphous phase to a predetermined depth and retain the crystal phase on the surface of the substrate, thereby forming projections on the surface of the substrate.

(b) Preferably, the above-mentioned aqueous hydrofluoric acid solution has a hydrofluoric acid concentration of 0.05 to 2.5 mol/l.

(c) The depth of etching from the surface is 0.005 to 0.2 μm.

That is, according to the present invention, the crystallized glass as substrate is both mechanically polished and chemically etched to form fine projections.

More detailedly, the mechanical polishing in the first stage gives the crystallized glass a very smooth and mirror-finish surface. The degree of mirror finish is such that the surface roughness, Rmax, is needed to be 150 Å or less, preferably 100 Å or less, or the magnetic head can fly without colliding against the projections on the polished surface under a spacing of about 0.1 μm.

The chemical etching in the second stage is carried out by dipping the mirror-like polished substrate in an aqueous hydrofluoric acid solution. By the etching, the continuous glass phase in the crystallized glass is selectively and preferentially etched. Thus, the crystal phase in the crystallized glass remains as isolated phase to form a great number of very fine projections having the same height and dispersed on the surface. In other words, the tips of these projections form a plane which is nearly parallel to the etched glass phase base plane.

Since the crystallized glass material contains ingredients such as an alkali metal oxide, alkaline earth metal oxide, $Al_2O_3$ and $SiO_2$, hydrofluoric acid is one of the most suitable for etching these ingredients.

Furthermore, according to the experiments of the present inventors, it has been found that the concentration of hydrofluoric acid is suitably in the range of 0.05 to 2.5 mol/l (corresponding to the range of 0.1 to 5.0 wt % when highly pure hydrofluoric acid is diluted with water) in the present invention.

If the concentration is not more than 0.05 mol/l (0.1 wt %), then the etching action is poor, i.e., the etching rate is low, it is not practical. If the concentration exceeds 2.5 mol/l (5.0 wt %), on the other hand, the etching rate is too high to control the etching amount. It is most preferably in the range of 0.25 mol/l (0.5 wt %) to 1.5 mol/l (3 wt %).

It is also possible to adjust the pH value of the hydrofluoric acid solution by incorporating into the solution, for example, ammonium fluoride or sodium fluoride, to moderately lower the etching rate for facilitating the etching operation.

(d) Subsequent to the procedures of making the glass substrate for magnetic discs as described in (a), (b) and (c), an undercoat film, a magnetic thin film and a carbon protective film are in turn laminated by sputtering on the substrate.

(e) Prior to the sputtering in step (d) above, the substrate is vacuum baked, and subsequent to the formation of the undercoat film, and magnetic thin film and carbon protective film, a lubricant is coated on the protective film.

One example of the present invention will be explained.

EXAMPLE 1

Production of a magnetic disc substrate using the crystallized glass basically comprises preparation of raw materials, melting with heat, formation of a glass plate, formation in a disc, heat treatment for generation of nuclei, heat treatment for growth of the nuclei, and surface polishing.

Steps for production are not limited to the above ones, but sputter etching or chemical etching may be conducted in place of the surface polishing or mechanical processing for realization of flat smoothness of disc surface at a high speed may be carried out after formation in disc and thereafter, the heat treatments may be carried out. Moreover, the heat treatment can be one step.

The order of steps or content of steps can be modified depending on techniques and properties of materials.

One example will be explained in accordance with the above-mentioned representative steps.

In this example, $Li_2O-SiO_2-P_2O_5$ system was used as raw materials. That is $Li_2CO_3$, $SiO_2$ and $H_3PO_4$ as raw material powders were weighed so that a $Li_2O$ content was 19.4 wt %, $SiO_2$ content was 77.9 wt %, and $P_2O_5$ content was 2.7 wt % and were mixed by usual method.

Then, the mixture was molten by heating to 1400° C. and then was formed into a glass plate of 2.0 mm thick by a floating method using liquid metal tin. A glass disc of outer diameter 130 mm — inner diameter 40 mm was cut out from this glass plate by mechanical processing.

Then, this glass disc was put in a heat treating furnace, heated to 550° C. at a heating rate of 10° C./min, then kept for 1 minute, thereafter heated to 600° C. at a heating rate of 10° C./min, kept at that temperature for 1 minute and then cooled. This cooling was carried out at a rate of 5° C./min.

The heat treatment at 550° C. mentioned above is a treatment for formation of crystal nuclei and the subsequent heat treatment at 600° C. is a treatment for growing the nuclei to a given size. These heat treatments are especially important for the crystallized glass substrate for a magnetic disc, because the density and size of the crystal nuclei precipitated in glass have a close relation with characteristics of magnetic disc.

Not only the temperature and time for the above heat treatments but also the glass compositions determine the density and size of crystal nuclei formed. Therefore, the heat treating temperature and time can be optionally varied as required. In general, the nucleating temperature is preferably somewhat higher than the glass transition temperature and the nuclei growing temperature is preferably higher than the treating temperature for formation of nuclei and lower than the softening temperature.

Next, the heat treated and cooled glass substrate was processed by a polishing machine. The polishing machine comprised the upper and lower two plates and the glass substrate to be polished was inserted between these plates by a carrier and was polished by rotating the plates.

The object of this polishing processing is to produce fine projections on the surface of crystallized glass. That is, the glass portion of the crystallized glass is lower than the crystallized portion in hardness and hence is more fastly polished and, as a result, fine projections can be formed on the surface. In this case, the crystallized portion becomes projections. Besides, if there are too high projections on the surface, pressure of the plates is concentrated to the points of these projections and so such high projections are rapidly removed.

Therefore, a substrate having projections of the uniform height on the surface can be obtained. Thus, there can be obtained the surface which is free from too high projections which may collide with a flying magnetic head and has fine and uniform projections necessary and sufficient to obtain high wear durability and to prevent sticking.

A pressure by the plates, rotating speed, time and costs for the polishing are important which decide the shape of fine projections on the processed surface.

Then, the polished surface of this glass substrate was washed with an organic solvent and pure water by brushing or ultrasonic cleaning.

Thereafter, the substrate was subjected to vacuum baking at 300° C. in a vacuum sputtering apparatus, and then a chromium undercoat film, a Co-Ni magnetic film and a carbon protective film were formed in succession on the surface of the substrate. Finally, the surface was coated with a lubricating oil comprising a fluorohydrocarbon in air to obtain a complete magnetic disc as shown in FIG. 1. The chromium undercoat layer may be omitted.

In FIG. 1, 1 denotes a crystallized glass substrate, 2 a chromium undercoat film, 3 a magnetic thin film and 4 a carbon protective film. In the crystallized glass substrate, 1A is a crystal phase and 1B an amorphous glass phase.

The thus obtained magnetic disc was tested on its performance. A recording density was 65,000 bits/inch and a minimum flying height of head in this case was 0.05 μm. CSS resistance (Contact Start Stop) was evaluated for wear durability to find that no head crash occurred before 50,000 times and besides there occurred no staining on the surface of magnetic head slider after the testing.

Further, this magnetic disc showed a low sticking power which was not more than that of conventional coating discs and this had no practical problems.

$Li_2O$-$SiO_2$-$P_2O_5$ was used as a raw material in Example 1, but materials for crystallized glass are not limited thereto and the following materials can also afford a favorable crystallized glass substrate for disc.

$Li_2O$-$SiO_2$ $Li_2O$-$Al_2O_3$-$SiO_2$ $Li_2O$-$MgO$-$Al_2O_3$-$SiO_2$ $MgO$-$Al_2O_3$-$SiO_2$ $Na_2O$-$Al_2O_3$-$SiO_2$ $BaO$-$Al_2O_3$-$SiO_2$

The precipitated crystal phase obtained from the above materials may be as follows.

$Li_2O.SiO_2$ $Li_2O.2SiO_2$ $Li_2O.Al_2O_3.2SiO_2$ $Li_2O.Al_2O_3.4SiO_2$ $SiO_2$ $2MgO.2Al_2O_3.5SiO_2$

These precipitated phases are determined by starting materials, heat treating conditions and a nucleation accelerator referred to hereinafter and are precipitated in various combinations and are never simply determined.

In general, the addition of a nucleating agent is often carried out for production of the crystallized glass. For example, there is a method of using a metallic colloid which is produced by combination of gold, silver or copper with cerium. In addition, oxides such as $TiO_2$, $ZrO_2$ and $P_2O_5$ can also be used as a nucleation accelerator. Besides, Nb, Ta, Mo, and W elements may be used. For some kinds of glass materials, the nucleating agent may not be added.

Since the size and density of crystal seeds can be controlled by changing the heat treating conditions, these heat treating conditions and further the glass materials may conviniently be chosen depending upon the properties of magnetic discs as desired.

The precipitated crystal phase formed by the two-state heat treatments carried out in Example 1 had an average density of $5 \times 10^4/mm^2$ and an average particle size of 0.05 μm.

When starting materials for this precipitated crystal phase are the same, the average density and average particle size are determined by the temperature and time of the two-state heat treatments.. What is important here is not the heat treating conditions, but the density and size of the resulting precipitated crystal phase.

From the experimental results which evaluated performance of a large number of substrate samples and performance of discs prepared using these substrates, it has been clarified that an average particle size of 0.01–3.0 μm and an average density of $10^2$–$10^6/mm^2$ are suitable characteristic ranges as substrate for disc.

If the particle size is less than 100 Å, fine projections formed on the surface of substrate are too small to avoid the problem of sticking of magnetic head. On the other hand, if it is more than 3.0 μm, the projections on the surface are too large which may inhibit the flying of a magnetic head and besides increase bit errors.

From the above results, the suitable average particle size of the precipitated crystal phase is within the range of 0.01–3.0 μm.

Similarly, the particle density also has upper and lower limits and if it is less than $10^2/mm^2$, sticking of magnetic head is apt to occur. If it is more than $10^6/mm^2$, wear of the slider surface of magnetic head becomes large and signal noise increases.

From the above results, the suitable density of precipitated crystal phase is within the range of $10^2$–$10^6/mm^2$.

Furthermore, the proportion of the sum of area of crystal particles present as projections on the surface to unit area of the substrate is also important. When this proportion exceeds 30%, there occurs a problem in flyability of head and thus 30% or less is suitable range and is sufficient.

In Example 1, projections-were formed on the surface by the two-stage heat treatments and subsequent polishing. The height of the projections is used for quantitative expression of the projections on the surface. This height means an average height of projections comprising crystal phase measured from a base line which is the central position of surface roughness possessed by the glass phase which is a continuous phase to the peak of respective projections.

The average height of projections after polishing in Example 1 was 0.02 μm. This average height of projections can be controlled by controlling the size and density of the precipitated crystal phase and polishing conditions, but as a result of various studies, it has been clarified that a suitable range of the height is 0.005–0.20 μm.

That is, if the height of projections is higher than 0.20 μm, the surface roughness increases and the magnetic head cannot stably fly or S/N is deteriorated. If the height is less than 0.005 μm, the surface property is close to that of mirror-like surface and so sticking to a magnetic head occurs.

From the above, the average height of fine projections is suitably within the range of 0.005–0.20 μm.

In Example 1, polishing was carried out after the heat treatments which were for growth of crystal nuclei and thus projections on the surface were formed utilizing difference in hardness of crystal phase and glass phase. The abrasion processing is merely one example, and in place of the abrasion methods, there may also be employed so-called ion milling or sputter etching method according to which a glass substrate is set under vacuum and $Ar^+$ ion is allowed to collide with the substrate at a high speed, thereby carrying out etching of the substrate.

Furthermore, there may be employed a so-called sand-blasting method according to which fine particles of $Al_2O_3$ or SiC are sprayed against the glass substrate together with air.

In addition, there may be employed chemical method according to which the crystal phase is formed in fine projections utilizing a difference in an etching speed of crystal phase and glass phase by a hydrofluoric acid type processing solution. This method is advantageous in that the process is relatively inexpensive because it merely comprises immersing crystallized glass substrate in a processing solution for a given period.

According to the present invention, a substrate for magnetic disc can be formed which makes efficient use of the excellent characteristics of crystallized glass and hence the following practical effects can be obtained.

1. Improvements in head flyability and head sticking property:

The crystallized glass substrate of the present invention can realize a stable low flying height of head with preventing sticking phenomenon of head. Quantitatively, if the head sticking power of a practically used coating disc is referred to as 1.0, that of conventional textured Ni-P substrate is 1.2–1.3 while that of the substrate of the present invention is 0.9–1.0.

With reference to flyability of magnetic head, comparison is made on minimum limit flying height when no projections are present which collide with head. That of the conventional Ni-P textured substrate is 0.15 while that of the substrate of the present invention is 0.05.

What is important is that the flying height of head can be lowered to 0.08 μm with keeping a low head sticking power.

This is because the projections on the surface of the disc substrate of the present invention are substantially formed utilizing the phase transformation from an amorphous phase to a crystal and so are uniform and high in reproducibility and controllability.

Furthermore, the contour of irregularities formed on the surface are distributed isotropically in both circumferential and radial directions in the disc surface and so sticking power to a magnetic head in circumferential and radial directions becomes isotropic. This is essentially different from the texturing which is processing of only one direction and is unsymmetrical.

2. Improvement of the wear durability of head and disc:

CSS of the thin film magnetic disc produced using the disc substrate of the present invention is more than 50,000 times and this is not inferior to the practically employed coating disc. That of the thin film magnetic disc produced using textured Ni-P substrate was 32,000 times and head crash occurred.

Reasons why the wear durability is improved by using the crystallized glass substrate as mentioned above are as follows:

First is that tips of projections comprising cyrstallized portion and present on the surface of the substrate have the action to clean the stains which are formed on the slider surface of magnetic head.

Second is that spaces among the projections trap fine wear powders which are produced due to sliding of head and disc.

Third is that since the head slider is supported by tips of projections, sticking is difficult to occur and besides rupture of protective film or medium in surface direction is difficult to occur. At some probability, the protective film or medium may be removed at the tips of projections and hard crystal phase may be exposed, but this does not: damage the effects of the present invention.

3. Reduction of number of steps:

As compared with the substrate of two-layer structure comprising an Al alloy and Ni-P plating film formed on the alloy which is widely used at present, the crystallized glass substrate of the present invention comprises a single layer and is a single substrate and thus the number of steps for production can be greatly reduced. In case of the Ni-P substrate, for example, the substrate can be completed only after the steps of electrolytic refining of Al, casting, hot rolling, cold rolling, press-cutting of disc, inner and outer diameter processing, surface roughening, heat treatment, surface finishing pretreatment for plating, plating of Ni-P, and polishing of the plated surface. The number of steps is as many as 12. On the other hand, the number of steps for production of crystallized glass substrate of the present invention is at most 6 as mentioned in examples, which is about half of the conventional method. As a result, production facility cost and processing cost can also be reduced by half and there is the great effect in reduction of costs for production of substrate.

4. Advantages based on properties of materials:

In case of the conventionally widely used substrate comprising an Al alloy and, formed thereon, an Ni-P plating film, the specific gravity of Al alloy is 2.63 while the specific gravity of the crystallized glass substrate of the present invention is 2.4–2.5 which is somewhat lighter than the Al alloy. Therefore, there is the advantage to reduce load to rotating mechanism of disc file.

The materials according to the present invention are substantially non-magnetic materials and so there is no fear of magnetization even by heating at 600°–800° C. This provides a great margin in heat resistance in process and sufficient degassing of substrate becomes possible as compared with the Ni-P substrate which is magnetized at higher than about 250°–280° C. and hence cannot be used at a temperature beyond this temperature range.

Since the magnetic disc substrate of the present invention is produced by once melting the materials and then glassifying through a liquid state, there are substantially no voids. This is opposite to the ceramic substrate which is produced by a powder sintering method and is apt to have voids. Magnetic disc very few in bit errors can be produced.

The magnetic disc substrate of the present invention is far higher in strength than ordinary glass. For example, the flexural strength of an ordinary glass plate is about 500 kg/cm$^2$ while that of the crystallized glass of the present invention is from 1500 to as high as 3500 kg/cm$^2$.

The magnetic disc according to the present invention has a hardly sticky surface to the magnetic head and allows the magnetic head to fly over the disc with a small spacing. The reasons therefor are as follows:

The crystals of crystallized glass are present in a state isolated from each other and dispersed in an amorphous phase. Therefore, the surface of substrate etched with a hydrofluoric acid solution has a uniform distribution of projections not oriented to radial and circumferential directions. This realizes the stickiness equal to operation modes both in the radial and circumferential directions.

As explained above, the texturing of prior art Ni-P substrates makes channels in the circumferential direction. Therefore, the textured discs approximately linearly contact magnetic heads at the raised-up parts (ridges) of both the sides of the channels, so that the contact area is disadvantageously broad and the stickiness becomes greater. Furthermore, the degree of stickiness is different between the radial direction and the circumferential direction, particularly more disadvantageously the stickiness is greater in the radial direction in seeking mode.

In the present invention, the mirror-like mechanical polishing of the crystallized glass at the first stage has a close relation with the small-spacing flying property of a magnetic head, and the chemical etching with hydrofluoric acid at the second state contributes to the stickiness of the magnetic head through the recesses formed on the disc..

What is important is that the etching does not allow the formation of the ridges which is a great problem in the Ni-P substrate-texturing, because the etching makes dissolution and removal in one direction forwards the interior of the substrate. The ridges are formed due to the formation of minute abrasives or chippings of a grinder edge formed by digging the disc material. The ridges are a serious obstacle against the small-spacing flying property of the magnetic head.

The chemical etching does not form such ridges and not retain any strain or stress in the substrate, because the ingredients of the substrate material are essentially ionized and moderately removed. Therefore, in accordance with this chemical etching, the good stickiness property can be given without damaging the good surface property realizing the small-spacing flying property of magnetic head obtained by the mirror-like polishing. This is the important point of the present invention.

In accordance with the present invention, the crystallized glass substrate is mirror-like polished so that the surface roughness is desirably 150 Å or less. The surface roughness of 50 Å may be obtained, if desired. In other words, the upper limit of the surface roughness should be at most 150 Å for allowing the magnetic head to stably fly under so a small spacing as about 0.10 μm without colliding with the projections of disc.

The temperature of an etching solution is preferably 30° C. or lower, more preferably 15° to 25° C. The etching time may be set depending upon the desired etching depth.

The concentration of hydrofluoric acid in the etching solution is preferably in the range of 0.1 to 5.0 wt %. As mentioned above, if this concentration is below or over the range, it is difficult to control the etching amount or etching rate, which is not practical.

In the etching operation, the amorphous phase which is a continuous phase in the crystallized glass is selectively etched and the dispersed crystal phase is retained as projections which form the unevenness on the surface of the substrate. Therefore, it is clear that the unevenness is increased as the etching time or hydrofluoric acid concentration is increased.

The surface roughness, Rmax, necessary and sufficient to reduce the stickiness should be determined by the performance of a magnetic disc file and the characteristics of the magnetic head. Thus, the surface roughness cannot be linearly chosen but freely with a certain range.

In accordance with the present invention, the flying property of head and the stickiness property of disc against head which are antinomy to each other in prior art Ni-P substrates both can be obtained. Therefore, the substrate of the present invention can afford very excellent discs.

The substrate of the present invention has an isotropic surface cross section in all the direction. Therefore, the stickiness property of the disc to the head is equal in a radial or circumferential .direction. Thus, the problem of a prior art Ni-P substrate that the stickiness in a radial direction is greater, is solved by the substrate of the present invention. This contributes to the reduction of load against the driving mechanism of the magnetic head and simplification of the device.

Since it may be said that the present invention substitutes the chemical etching for the texturing of a prior art Ni-P substrate the production equipments and costs are greatly reduced. The chemical etching can advantageously treat a plurality of substrates in a rack and, therefore, it is superior in productivity or mass production to the prior art.

The crystallized glass substrate of the present invention is a single substance.. Therefore, the use of such substrate can reduce all the number of production steps, number of equipments, material costs and production costs down to about a half of those of the prior art Ni-P substrate which is a composite comprising an Ni-P plated aluminum alloy. Thus, the substrate of the present invention is essentially cheaper and has excellent characteristics.

EXAMPLE 2

Figure 2:
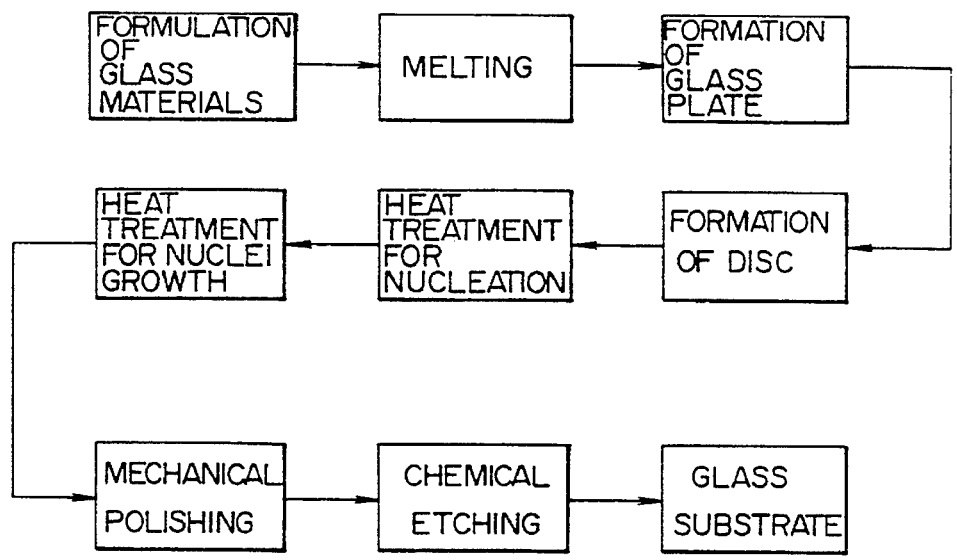
FIGS. 2 and 3 are diagrams illustrating the process steps according to the present invention.

A crystallized glass substrate for a magnetic disc was made in accordance with the procedure as shown in FIG. 2.

The procedure comprises the steps of preparing a glass formulation, melting the formulation, forming a glass plate, making a glass disc, heat treating the disc for nucleation, heat treating the disc for growing nuclei, mechanically polishing the disc and chemically etching the disc with hydrofluoric acid.

In this example, the glass used was of a $Li_2O$—$SiO_2$—$P_2O_5$ system. Raw materials were formulated so that a $Li_2O$ content was 19.4 wt %, a $SiO_2$ content 77.9 wt % and a $P_2O_5$ content 2.7 wt %, and mixed in a usual way. The mixture was molten at 1400° C. and formed in a glass plate of 2.0 mm thick by a usual floating method using liquid metallic tin. This glass plate was machined to form a disc of 130 mm in outer diameter and 40 mm in inner diameter.

Then, this glass was placed in a heat treating furnace, heated to 550° C. at a heating rate of 10° C./min and then to 600° C. at a heating rate of 10° C./min, maintained at that temperature for 1 min, and cooled at a cooling rate of 5° C./min.

The heat treatment to 550° C. was made for forming crystal nuclei in the glass, and the heat treatment to 600° C. was made for growing the nuclei to a predetermined size.

The crystallized glass prepared through the heat treatments above was machined in a disc, which was then mechanically polished to a mirror-like surface. That is, the disc was placed via spacers between two upper and lower plates of a polishing machine. The plates were pressed and rotated while feeding a polishing liquid containing an alumina powder or SiC powder. The glass disc was uniformly machined and smoothened through planetary gear movement with the spacers.

The disc was then washed with pure water by brushing, and dried.

The thus obtained disc had a surface roughness, Rmax, of 100 Å when measured by a contact surface profiler (Talystep: Rank Taylor Hobson Ltd.).

The disc in a polytetrafluoroethylene-made rack was dipped into an aqueous solution containing 2.5 wt % of highly pure hydrofluoric acid and chemically etched. The etching liquid was used at 20° C. under stirring and continuously filtered. The etching time was 20 seconds.

Figure 3:
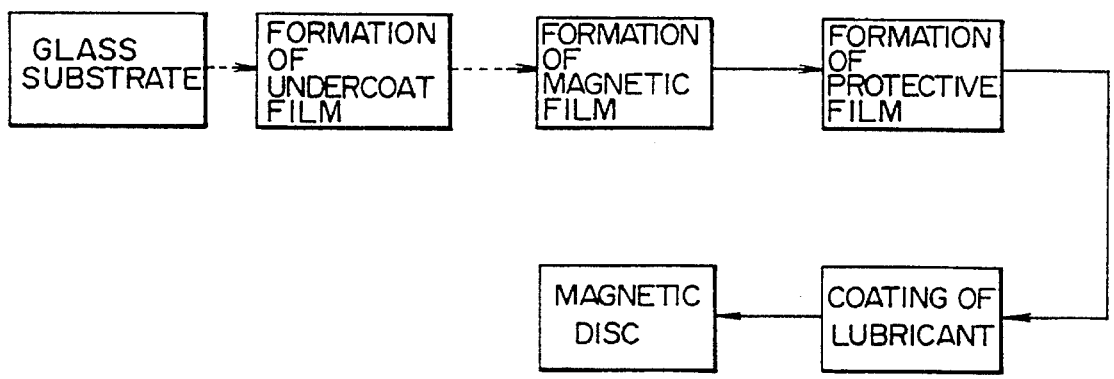

On the thus obtained glass substrate were formed an undercoat film and a magnetic recording film by sputtering in accordance with the procedure as shown in FIG. 3. Then, a carbon protective film was formed on the magnetic recording film and further coated with a lubricant to complete a thin film magnetic disc.

This procedure is in more detail explained. The glass substrate obtained above was placed on a substrate holder of a sputtering apparatus and baked at 300° C. under vacuum. On the substrate were formed in turn an undercoat, a magnetic film and a carbon protective film. After the substrate was removed from the sputtering apparatus, a lubricant was coated on the substrate to form a magnetic disc.

The thus obtained magnetic disc was rated in the characteristics in accordance with a usual rating method. As a result, the minimum flying height of a magnetic head was 0.05 μm. The stickiness of the magnetic head was 80 to 90% of that of prior art coated discs and about ½ of the stickiness of a Ni-P substrate disc. Thus, the stickiness and low flying height both were satisfied.

The CSS (Contact Start Stop) characteristics were examined and, as a result, it was found that there occurred no head crash and there observed no stains on the slider face of the magnetic head after rotation of 50,000 times.

EXAMPLES 3 to 12

Ten (10) magnetic discs were made. The results are shown in Table 1 together with comparative examples of prior art discs using Ni-P substrates and conventional glass substrate.

The glass material used in EXAMPLES 3 to 12 was of a $Li_2O$—$SiO_2$—$P_2O_5$ system. The crystallized glass discs were made in the same manner as in EXAMPLE 2. Thereafter, these discs were etched with hydrofluoric acid to form projections on the surfaces of the discs. However, the discs of EXAMPLES 11 and 12 were physically or mechanically etched. The etching conditions, the sizes of the projections and the mechanical properties of the magnetic discs having a magnetic recording film and protective film formed thereon are shown in Table 1.

In EXAMPLES 3 to 10, the chemical etching was conducted by using a 0.5% HF etching solution for a period of time as shown in Table 1. It is seen that the etched amount is increased and the etching rate at the amorphous phase of the crystallized glass is higher than that at the crystallized phase as the period of time is increased from 0 second to a maximum of 400 seconds as shown in EXAMPLES 3 to 8. Therefore, the height of the projections are increased. If the height exceeds 5 nm, then the head stickiness is reduced to a no problem level. On the other hand, in EXAMPLES 8 and 10 of the discs having much higher projections, the head undesirably collided with the projections of the magnetic disc. From this, it is seen that the proper height of the projections for satisfying the head flyability is in the range of 5 to 200 nm.

The concentration of HF for forming the range of height as mentioned above is seen to be suitably in the range of 0.1 to 5.0 wt %.

The concentration used in EXAMPLE 9 was about 0.05 wt %, which is below the range above and was so low that the etching rate was extremely lowered and the production efficiency was reduced. To the contrary, the concentration used in EXAMPLE 10 was about 7.5 wt %, which is beyond the range above and was so high that the etching rate was too high to control the height of the projections. From the foregoing, the HF concentration is suitably in the range of 0.1 to 5.0 wt %.

From Table 1 it is also seen that the discs of EXAMPLES 4 to 7 could withstand 50,000 times or more in the CSS durability which is a scale for mechanical durability, and they had excellent characteristics such as recording density and error. Thus, the discs of EXAMPLES 4 to 7 satisfy the requirements of the present invention.

For reference, comparative examples are also shown in Table 1, in which it is seen that prior art textured Ni-P substrates were poor in the flying property of a magnetic head, the heat resistance of the substrate and the number of process steps of producing the substrate. In another comparative example in which a strengthened glass was textured in the same manner as for the Ni-P substrate, there was a problem that the stressed surface of the glass was chipped. Such discs had a poor flying property and many errors.

In EXAMPLE 11, a sputtering etching method was used to form projections. In a vacuum sputtering apparatus, a mechanically polished glass substrate was placed and connected as a cathode bias. RF voltage was applied to the substrate and $Ar^+$ ions generated by a plasma were allowed to impinge to the substrate to etch it and form the projections on it. The feature of this etching process is a dry process. Therefore, a magnetic film and protective film can be made directly after the sputter etching. Thus, the production of the magnetic discs by the sputter etching is very efficient.

In EXAMPLE 12, the projections were formed by a sand blasting method. That is, an $Al_2O_3$ powder having an average particle size of 5 μm was blown against the glass substrate with compressed air. The thus obtained projections had the desired properties.

In these examples and the comparative examples, the substrates were formed in magnetic discs by washing the substrates and applying a chromium undercoat film of 100 nm thick, a Co-Ni magnetic film of 50 nm thick, a carbon protective film of 40 nm thick and a lubricant coat of 8 nm thick.

Figure 4:
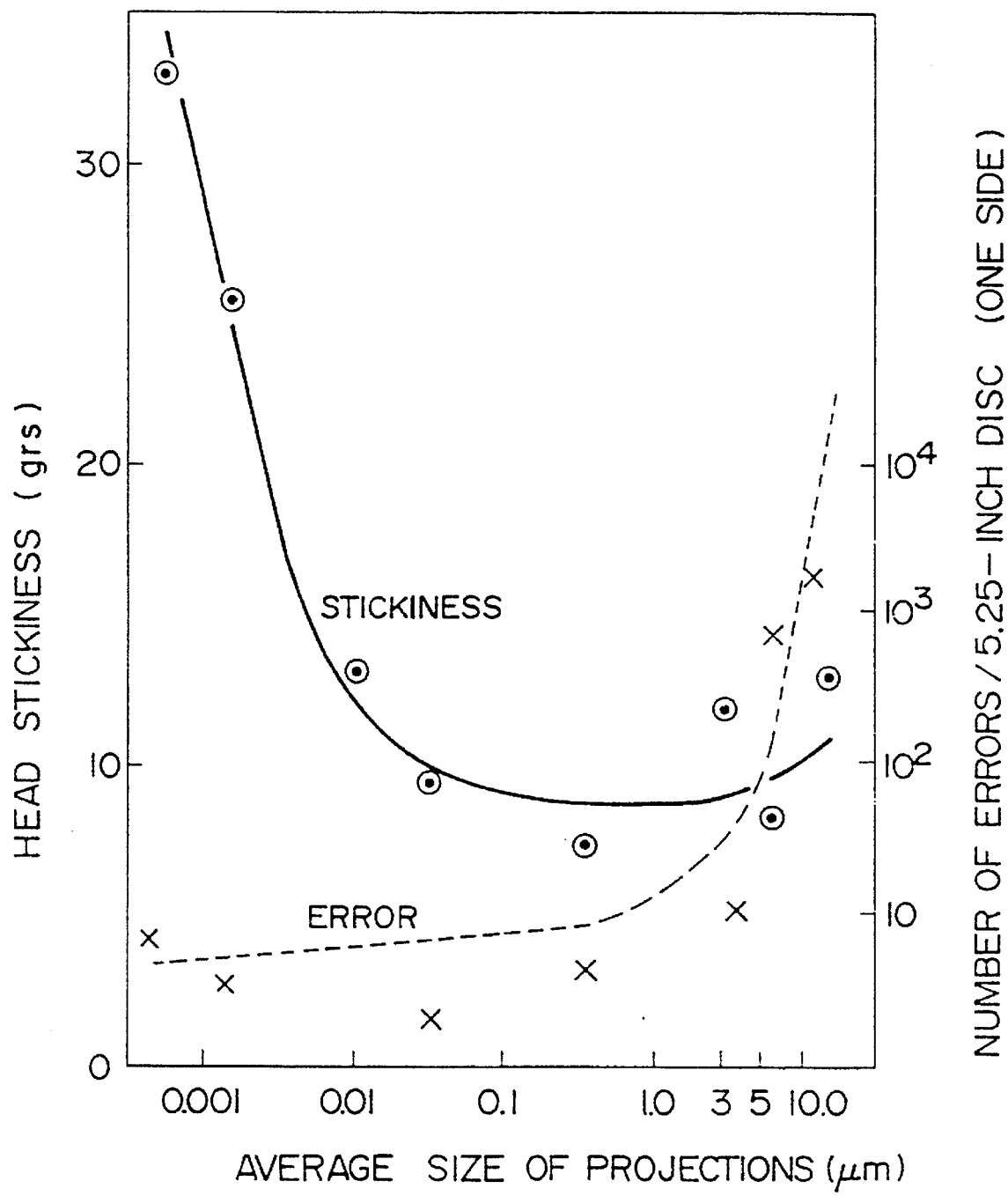
FIG. 4 is a graph showing relationships of a head stickiness and a number of errors/5.25 inch-diameter disc versus an average size of projections on a disc substrate according to the present invention.

The size of the projections will be referred to below. The size is one of the crystals in the cyrstallized glass when observed down. This has a relation with a contact pressure and surface area when contacted with a magnetic head and, therefore, a close relation with the stickiness to the head. As is seen from FIG. 4, a certain extent of size is needed to reduce the stickiness to the head down to a certain level.

On the other hand, the size of the minimum signal unit, i.e., bit cell, is about 0.6 μm × 15.0 μm in the case of 40,000 bit/in and 1,700 track/in. When the size of projections is small, the influence of them may be ignored in a signal aspect.. However, from FIG. 4, it is seen that when they have a size of 5 μm or larger, it has an influence on signal power and results in bit error.

From the foregoing, it is seen that the size of projections is desirably in the range of 0.01 to 3.0 μm.

In order to regulate the size of projections, the following method may be used.

The crystallized glass disc substrates were made in the same manner as in EXAMPLE 1. Then, the disc was heated to 550° C. at a heating rate of 10° C. and maintained at this temperature for 1 minute, then heated to 900° C. at the same heating rate and maintained at this temperature for a predetermined period of time to grow the nuclei and regulate the size of projections. From FIG. 4, it is seen that the maintaining period of time at 900° C. was 200 minutes for obtaining projections of about 10 μm and about 1 second for obtaining projections of about 0.01 μm (that is, the glass should be cooled immediately after the heat treatment). The cooling rate was 5° C./min.

In order to obtain the size of projections between 0.01 to 10 μm, the maintaining period of time is chosen between 1 second and 200 minutes. In order to obtain the size of projections of 0.001 μm, the second stage of heat treatment for nuclei growth should not be carried out.

The density of projections will be referred to below.

Figure 5:
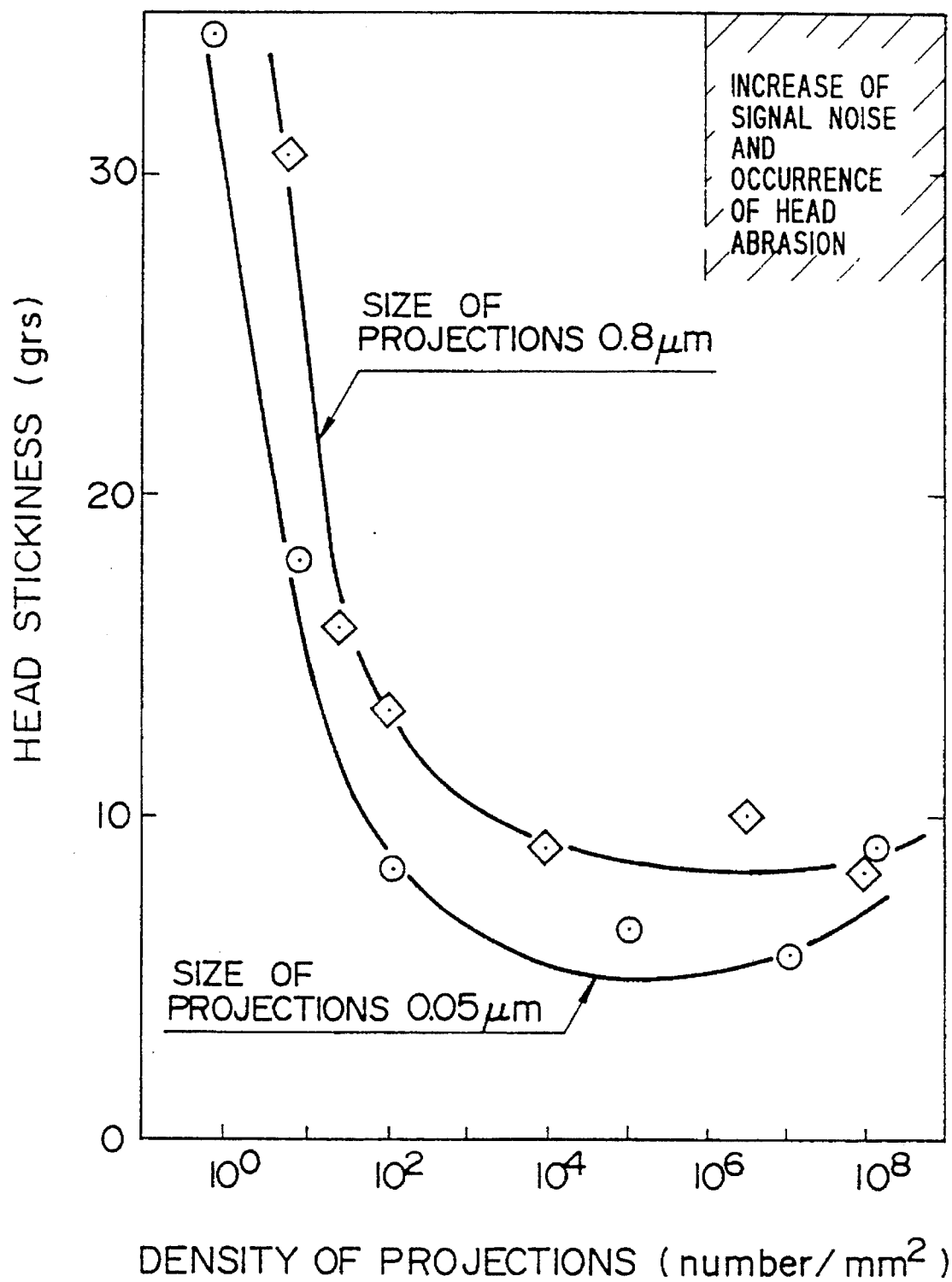
FIG. 5 is a relationship of a head stickiness versus a density of projections on a disc substrate according to the present invention.

The density of projections has a close relation with the stickiness, because the number of projections on the disc supporting a magnetic head is important. As shown in FIG. 5, it is seen that the stickiness can be reduced as the density of projections is increased. This means that when the number of projections is reduced, the surface of the disc is close to the mirrorlike state, i.e., sticky state.

On the other hand, when the density of projections is about $10^6/mm^2$ or more, the noise output of the disc is increased and inhibits the high recording densification.

The increase of the density of projections leads to a problem that the head is abraded.

From the foregoing, it is seen that the density of projections is suitably in the range of about $10^2/mm^2$ to $10^6/mm^2$.

The density of projections may be regulated by changing the heat treating period of time in the first stage of heat treatment for nucleation.

The same raw materials as in EXAMPLE 1 were used to form disc substrates. The substrates were subjected to the first stage of heat treatment at 550° C. for various periods and the second stage of heat treatment at 900° C. for 1 minute. When the heat treating time was 60 minutes, the density of projections was about $10^8/mm^2$. When the time was 1 minute, then the density was about $5×10^4/mm^2$. When the time was 1 second, the density was $1/mm^2$. In this case, the size of projections was 0.05 μm and substantially unchanged, and the heating rate was 10° C./min. and the cooling rate was 5° C./min.

TABLE 1

| Example No. | Kind of Substrate | Formation of Projections | Conc. (%) | Time (sec.) | Surface Characteristics | | |
|---|---|---|---|---|---|---|---|
| | | | | | Projetion Height | Projection Density | Projection Diameter |
| 3 | Crystallized glass | HF etching | 0.5 | 0 | 3 nm | $3 × 10^4/mm^2$ | av. 0.04 μm |
| 4 | " | (at room temp.) | " | 5 | 5 | $5 × 10^4/mm^2$ | 0.05 |
| 5 | " | | " | 20 | 50 | " | " |
| 6 | " | | " | 30 | 100 | " | " |
| 7 | " | | " | 200 | 200 | " | " |
| 8 | " | | " | 400 | 300 | $7 × 10^4/mm^2$ | " |
| 9 | " | | 0.05 | 200 | 4 | $4 × 10^4/mm^2$ | " |
| 10 | " | | 7.5 | 5 | 400 | $8 × 10^4/mm^2$ | " |
| 11 | " | Sputter etching (Ar gas; 10 mTorr; 5 min) | | | 60 | $5 × 10^4/mm^2$ | " |
| 12 | " | Sand Blasting (Blowing of 5 μm $Al_2O_3$ powder) | | | 30 | " | " |
| Comp. | Ni-P/Al (plane) | Mirror-like polishing | | | Rmax 8 nm | — | — |
| " | Ni-P/Al (textured) | Texturing after mirror-like polishing | | | Rmax 100 nm | Circumferential Continuous Grooves and Banks | — |
| " | Strengthened Glass (textured) | " | | | Rmax 100 nm | Circumferential Continuous Grooves and Banks | |

| Example No. | Head Flying Property | Head Stickiness | CSS Durability | Heat Resistance | Number of Steps | Error |
|---|---|---|---|---|---|---|
| 3 | Good | Bad | 20 k times | 800° C. | 6 | |
| 4 | " | Good | >50 k times | " | 6 | |
| 5 | " | " | >50 k times | " | 6 | |
| 6 | " | " | >50 k times | " | 6 | |
| 7 | " | " | >50 k times | " | 6 | |
| 8 | Bad | " | >10 k times | " | 6 | many |
| 9 | Good | Bad | 17 k times | " | 6 | |
| 10 | Bad | Good | 3 k times | " | 6 | many |
| 11 | Good | " | >50 k times | " | 6 | |
| 12 | " | " | >50 k times | " | 6 | |

TABLE 1-continued

| | | | | | | |
|---|---|---|---|---|---|---|
| Comp. | " | Bad | 18 k times | 280° C. (Bad) | 12 (Bad) | |
| " | Bad | Good | >50 k times | 280° C. (Bad) | 13 (Bad) | |
| " | " | " | >50 k times | 400° C. | 6 | many |

What is claimed is:

1. A magnetic disc substrate, which comprises a crystallized glass consisting essentially of an amorphous glass continuous phase and crystal particles dispersed in said continuous phase, said substrate having projections of said crystal particles on the surface of said glass phase, said crystal particles having an average particle size of 0.01 to 3.0 µm and being present at a density of $10^2$ to $10^6/mm^2$ on the surface of said substrate, the total surface area of said projections of crystal particles occupying at most 30% of the unit surface area of said substrate, and said projections of crystal particles having an average height of 0,005 to 0.2 µm.

2. The substrate according to claim 1, wherein said crystallized glass is made from a glass material of a $Li_2O$—$SiO_2$, $Li_2O$—$Al_2O_3$—$SiO_2$, $Li_2O$—$MgO$—$Al_2O_3$—$SiO_2$, $MgO$—$Al_2O_3$—$SiO_2$, $Na_2O$—$Al_2O_3$—$SiO_2$ or $BaO$—$Al_2O_3$—$SiO_2$ system.

3. The substrate according to claim 1, wherein said crystal particles have one or more compositions selected from $Li_2O.SiO_2$, $Li_2O.2SiO_2$, $Li_2O.Al_2O_3.2SiO_2$, $Li_2O.Al_2O_3.4SiO_2$, $SiO_2$ and $2MgO.2Al_2O_3.5SiO_2$.

* * * * *